(12) United States Patent
Schubert et al.

(10) Patent No.: US 9,381,670 B2
(45) Date of Patent: Jul. 5, 2016

(54) CERAMIC COMPOSITION AND CERAMIC INJECTION-MOLDING PROCESS

(71) Applicant: Robert Bosch GmbH, Stuttgart (DE)

(72) Inventors: Martin Schubert, Stuttgart (DE); Andre Moc, Grossschoenau (DE); Thomas Loibl, Oberstdorf (DE); Imke Heeren, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 14/152,763

(22) Filed: Jan. 10, 2014

(65) Prior Publication Data

US 2014/0197583 A1      Jul. 17, 2014

(30) Foreign Application Priority Data

Jan. 11, 2013   (DE) .......................... 10 2013 200 285

(51) Int. Cl.
| | |
|---|---|
| *C04B 35/111* | (2006.01) |
| *B28B 1/24* | (2006.01) |
| *C03C 10/00* | (2006.01) |
| *C04B 35/64* | (2006.01) |
| *C04B 35/117* | (2006.01) |
| *C04B 35/634* | (2006.01) |
| *C03C 14/00* | (2006.01) |

(52) U.S. Cl.
CPC ............... *B28B 1/24* (2013.01); *C03C 10/0036* (2013.01); *C03C 14/00* (2013.01); *C04B 35/117* (2013.01); *C04B 35/634* (2013.01); *C04B 35/64* (2013.01); *C03C 2214/20* (2013.01); *C04B 2235/3206* (2013.01); *C04B 2235/3208* (2013.01); *C04B 2235/3213* (2013.01); *C04B 2235/349* (2013.01); *C04B 2235/36* (2013.01); *C04B 2235/6022* (2013.01)

(58) Field of Classification Search
CPC ........ C04B 35/111; C04B 35/117; B28B 1/24
See application file for complete search history.

(56) References Cited

U.S. PATENT DOCUMENTS

| | | | | |
|---|---|---|---|---|
| 2011/0077141 | A1* | 3/2011 | Walker ................. | C04B 35/111 501/32 |
| 2012/0193878 | A1* | 8/2012 | Suzuki ................. | B65G 49/061 279/3 |

FOREIGN PATENT DOCUMENTS

| | | | |
|---|---|---|---|
| DE | 2 326 086 A1 | | 12/1974 |
| DE | 199 37 163 A1 | | 2/2001 |
| DE | 10 2008 054 631 A1 | | 6/2010 |
| EP | 0 180 230 A1 | | 5/1986 |
| JP | 57052101 | * | 3/1982 |
| JP | 10297957 | * | 11/1998 |
| JP | 20011268852 | * | 5/2001 |

* cited by examiner

*Primary Examiner* — Karl Group
(74) *Attorney, Agent, or Firm* — Maginot, Moore & Beck LLP

(57) ABSTRACT

A ceramic composition for an injection-molding process for producing a combustion chamber pressure sensor, in particular for producing an insulation punch of a combustion chamber pressure sensor, includes a ceramic component in a proportion of greater than or equal to 50% by weight and a glass component in a proportion of less than or equal to 50% by weight. The ceramic component includes aluminum oxide. The glass component includes silicon dioxide or a silicon dioxide precursor. The ceramic composition further includes an alkaline earth metal oxide or an alkaline earth metal oxide precursor. The ceramic composition allows production of an insulation punch having a particularly good insulation capability. A ceramic injection-molding process includes the ceramic composition.

9 Claims, 2 Drawing Sheets

CERAMIC COMPOSITION AND CERAMIC INJECTION-MOLDING PROCESS

This application claims priority under 35 U.S.C. §119 to patent application no. DE 10 2013 200 285.8 filed on Jan. 11, 2013 in Germany, the disclosure of which is incorporated herein by reference in its entirety.

BACKGROUND

A wide variety of ceramics are, owing to their specific materials properties, being employed to an ever greater extent in mechanical engineering and in the motor vehicle sector, the chemicals sector, the electronics sector, in the consumer sector and also generally in microsystem and process engineering. For high strength and reliability of this class of materials, defect-free microstructures are advantageous. In the automobile sector in particular, it can be particularly advantageous to be able to produce components having tight tolerances at low cost virtually without final machining.

Components having functional integration are being increasingly provided. This means that specific functional layers, e.g. heaters, electrodes or conductor tracks, for example, are implemented in an injection-molded component. The application of the functional layers can advantageously take place directly during shaping. Materials mixtures or systems for injection molding, in particular ceramic injection molding, at present consist of mixtures containing polymers and wax-based constituents. Although such systems can sometimes have good rheological properties during injection molding, joining seams may arise at divisions of streams. Joining seams can represent weak points in the microstructure, and they are therefore advantageously avoided in the case of very high stresses.

For example, joining technology of sensors often requires insulating components which can be positioned, for example, between the sensor element and components forming the housing. The task of these components is, in particular, decoupling of the actual sensor element from an electrically conductive housing so that signal stability is ensured over the life of the sensor. A high insulation quality is therefore desirable.

The document EP 0 180 230 A1 discloses a process for producing a polycrystalline body comprising a zirconium phase and a cordierite phase.

The document DE 10 2008 054 631 A1 describes a process for producing a measuring element, in particular for use in gas measurement sensors, for example lambda sensors, nitrogen oxide sensors and temperature measurement sensors.

The document DE 2 326 086 A1 describes an electrochemical measurement sensor for determining the oxygen content in offgases, in particular in exhaust gases from internal combustion engines.

Furthermore, the document DE 199 37 163 A1 discloses a screen printing paste for the manufacture of planar ceramic elements, in particular for the manufacture of a sensor element.

SUMMARY

The present disclosure provides a ceramic composition for an injection-molding process for producing a combustion chamber pressure sensor, in particular for producing an insulation body of a combustion chamber pressure sensor, which comprises a ceramic component in a proportion of greater than or equal to 50% by weight and a glass component in a proportion of less than or equal to 50% by weight, where the ceramic component comprises aluminum oxide and the glass component comprises silicon dioxide or a silicon dioxide precursor and, additionally, an alkaline earth metal oxide or an alkaline earth metal oxide precursor is provided.

The present ceramic composition is in particular an injection-molding composition and can be particularly advantageously suitable for producing a combustion chamber pressure sensor or an insulation body of such a sensor. The component referred to as ceramic composition is thus, in particular, a raw injection-molding composition or a preceramic composition.

Due to the ceramic composition comprising a ceramic component in a proportion of greater than or equal to 50% by weight and a glass component in a proportion of less than or equal to 50% by weight, where the ceramic component comprises aluminum oxide ($Al_2O_3$) and the glass component comprises silicon dioxide ($SiO_2$) or a silicon dioxide precursor, it is possible to produce an insulation body such as an insulation punch having a particularly high insulation quality. This is because, firstly, the aluminum oxide, which can be considered to be the ceramic base component since it is present in a proportion of greater than or equal to 50% by weight, itself has a very high insulation resistance. In addition, the presence of silicon dioxide in the ceramic composition makes it possible to form a ceramic body which comprises an aluminum oxide containing silicate glass or silicon dioxide. In this way, it is possible, in particular, to prevent the insulation resistance of the finished product from dropping below the permissible tolerance limit, for instance during aging under a humid atmosphere. The cause of such a decrease in the insulation resistance can, in particular, be considered to be the surface chemistry which leads to hydroxyl groups (OH groups) being able to be formed on the surface of the shaped component in the presence of air. These hydroxyl groups can allow or promote the deposition of a film of water under a humid atmosphere. Such an enveloping or adhering film of water can, for instance in combination with surface impurities, be slightly electrically conductive and thus lead to a reduction in the overall insulation resistance of the component. Such formation of an electrically conductive film on the component surface can be prevented by provision of silicon dioxide since this component makes the attachment of hydroxyl groups and thus a film of water difficult or prevents it entirely due to a low tendency for attachment of water.

The required insulation resistance of ceramic insulation bodies produced by a ceramic composition as described above can thus be kept within a tolerable range without problems even under a humid atmosphere. This can be, in particular, an advantage for parts of a combustion chamber pressure sensor since moisture cannot be ruled out completely here but a high insulation quality is important in order to be able to ensure accurate and reliable pressure measurements in the interior of a combustion chamber, for example a cylinder of an internal combustion engine. Particularly clean and effective combustion can be made possible in this way.

Apart from a significantly improved insulation quality, an insulation body which can be produced by means of a ceramic composition as described above is very stable since aluminum oxide itself has a very high stability. In addition, the mechanical strength, for example in an installed state of the component to be produced, can be increased significantly compared to pure aluminum dioxide by the presence of silicon dioxide. Intrinsic cracks and chipping at edges can also be reliably avoided in the case of mechanical stress since the glass matrix allows process-related pores or defects in the microstructure to heal or be closed during sintering.

The components produced using a ceramic composition as described above, for example for pressure sensors, can thus be used particularly advantageously even under harsh ambient conditions, in particular in respect of pressure, temperature and atmosphere.

The production of an aluminum oxide containing silicate glass or an aluminum oxide ceramic comprising silicon dioxide can be carried out as described above, in particular in two advantageous ways. A first illustrative possibility comprises production of a glass in the inventive ceramic composition itself, in particular during sintering. For this purpose, glass-forming raw materials or a silicon dioxide precursor which are converted into silicon dioxide or glass, in particular in a sintering operation, can be provided in the ceramic composition. Furthermore, glass, for example a glass frit, in particular in milled form, can be present as such in the ceramic composition. This can subsequently be milled and mixed with the aluminum oxide, after which the mixture obtained can be homogenized in a subsequent milling process. A further possibility is to comminute and at the same time homogenize all glass-forming raw materials together with the aluminum oxide in a joint milling process. In both cases, wet milling for a period of up to 24 hours, for instance in a drum mill, can be suitable. Milling can be followed by drying, preferably but not necessarily in a spray dryer.

Furthermore, the ceramic composition comprises an alkaline earth metal oxide such as magnesium oxide (MgO), calcium oxide (CaO), strontium oxide (SrO) or barium oxide (BaO) or an alkaline earth metal oxide precursor. These components can advantageously serve as sintering aids and control or influence the sintering process in an appropriate way. Once again, one or more alkaline earth metal oxides can be directly present, or a precursor thereof. The precursor can in turn be converted into alkaline earth metal oxides, especially during the sintering operation. In detail, the alkaline earth metal compound can react with the silicon dioxide or with the aluminum oxide to form further phases which have lower melting points than the pure silicon dioxide or aluminum oxide. Thus, it is possible to achieve, for example, liquid-phase sintering, as a result of which the sintering temperature can be reduced and process costs can be saved. The choice of the alkaline earth metal compounds used can determine the parameters of the liquid-phase sintering, for example the sintering temperature, viscosity, etc.

Furthermore, the ceramic composition can comprise, in a manner known per se, a binder system which can basically be formulated in a manner known for ceramic injection molding. The binder system can bring about adhesion of the ceramic particles and thus exert a positive influence on the injection molding behavior.

In one embodiment, the alkaline earth metal oxide or the alkaline earth metal oxide precursor and the silicon dioxide or the silicon dioxide precursor can be present in an amount for setting a ratio of alkaline earth metal oxide to silicon dioxide of from 30% by weight:70% by weight to 70% by weight:30% by weight. For example, the alkaline earth metal oxide or the alkaline earth metal precursor and the silicon dioxide or the silicon dioxide precursor can be present in an amount to set a ratio of alkaline earth metal oxide to silicon dioxide of from 40% by weight:60% by weight to 60% by weight:40% by weight. A ratio of 1/1% by weight can also be present. It was found here that the sintering behavior is particularly positively influenced in this composition in particular. In the phase diagram, this composition is at a boundary between two different phases, as a result of which the glass state can be very stable.

In a further embodiment, the alkaline earth metal oxide precursor can be selected from the group consisting of carbonates, in particular calcium carbonate (lime), magnesium carbonate, strontium carbonate and talc. The abovementioned precursors in particular are cheap to obtain and can be well-suited to an injection molding process. Here, lime (calcium carbonate, $CaCO_3$) can, particularly under sintering conditions, form calcium oxide (CaO), while talc (magnesium silicate hydrate, $Mg_3Si_4O_{10}(OH)_2$) can, in particular, be suitable for decomposing to form magnesium-containing silicates which are particularly reactive and together with further alkaline earth metal compounds form the desired glass.

In a further embodiment, the silicon dioxide precursor can be selected from the group consisting of talc and kaolin ($Al_4[(OH)_8[Si_4O_{10}]$). In this embodiment, too, it can be advantageous for the respective precursors to decompose in a number of stages on heating up to 1000° C. and form reactive Al-containing silicate phases which can easily react with the alkaline earth metal compounds and ultimately form the desired glass. Kaolin and talc are also naturally occurring raw materials which have a very favorable price.

In a further embodiment, it is possible to provide a binder system which comprises a mixture comprising polyvinyl butyral, at least one polyacrylate, at least one polyethylene glycol and at least one triethanolamine carboxylic ester. The above-described binder system is thus based on the use of the thermoplastic polymer polyvinyl butyral (PVB) which has strong hot-adhesive properties. Use of a binder system based on polyvinyl butyral makes it possible to obtain extremely strongly adhering and stable bonds between a functional element, for instance a label, and a ceramic injection-molded body. Correspondingly, particularly stable and long-life components can be produced in a ceramic extrusion process. Specifically, however, nonlimiting uses of the above-described binder system encompass, for example, the production of fuel cells (SOFCs), spark plugs, lambda sensors or combustion chamber pressure sensors. In particular but not exclusively, the ceramic system described or the binder system can in principle also be used in conjunction with other ceramic components.

In addition, the above-described composition of the organic binder system or compound system displays excellent rheological properties, so that it is also possible to produce components which have a highly complex geometry. For example, components can also be produced very stably when they have perforations or hole structures, for example for functional integration. Geometric perforations often require, in injection-molding technology, division of the flow front of the composition on introduction of the ceramic composition into the injection-molding tool. The divided flow front of the composition flows together again after flowing around a solid part. In such a combining of the streams, the above-described binder system can lead to a particularly defect-free joining of the streams of the composition without a joining seam or other defects remaining. Even after sintering, the presence of joining seams or some other defects can be avoided when using an organic binder system as described above. The component produced can have a particularly good long-term stability as a result.

Furthermore, the use of a binder system based on polyvinyl butyral makes it possible to produce extremely homogeneous and pore-free ceramic microstructures which have an extraordinarily high strength. The strengths can be compared by measurement on zirconium dioxide using conventional materials.

An organic binder system as described above also has the further advantage that, compared to, for example, wax-based systems such as polyethylene waxes which are known from the prior art, the binder can be removed significantly more quickly in the thermal processes following shaping. This makes it possible to save about 30% of the usual process time, which can reduce costs and can prove to be particularly advantageous in an at least partly automated process.

The above-described organic binder system also has the advantage over the binder systems known from the prior art that a greatly reduced shrinkage on cooling occurs. As a result, the trueness of shape of the injection-molded components is greater and planar flat places on the components do not acquire concave depressions but, as a result of the reduced shrinkage on cooling, remain flat. As a result, components having, in particular, strict requirements in respect of dimensional stability or in respect of the tolerances of the dimensions and geometry can be produced by use of the above-described organic binder system.

Injection-molded components also advantageously have, after removal from the injection-molding tool, a high hardness, so that the dimensional stability may also be able to be retained in a process in which the shaped bodies are handled by means of fully automatic handling devices. The composition of the organic binder system or of the individual components thereof is adapted in such a way that these requirements can likewise be adhered to.

In the binder system, the polyvinyl butyral performs, in particular, the function of the actual binder. Accordingly, this component can interact with the ceramic powder to be added and thus ensure cohesion of the system, for example in the molten state during shaping. Polyvinyl butyral can in the hot state also have a high tendency to stick to other organic systems such as, in particular, further systems based on polyvinyl butyral. This can, by way of example, be realized for functional layer packets which have been produced by screen printing and are formed from printing pastes based on polyvinyl butyral.

As further component, at least one polyacrylate, for example a polymethacrylic ester or polymethyl methacrylate (PMMA) or polybutyl methacrylate (PBMA) is present in the above-described binder system. This class of substances can serve, in particular, to set the rheological properties, for example a preferred flow behavior. In particular, the presence of polyacrylates can result in the mixture being liquid in the hot state but be a hard glass in the cooled state. This can serve not only for dimensional stability but also for improved defect-free printing on the component. Here, the polyacrylates can replace, in particular, the wax-like constituents of the binder system known from the prior art, with, for instance, the binder removal behavior being able to be improved.

Furthermore, polyethylene glycol (PEG) provided in the binder system can serve, in particular, to maintain particularly good stability during and after the production process. In detail, thermal processes which can drive the binder off from the component, for example by cracking, are necessary for converting a green state into a ceramic state or into a ceramic component. This can be achieved by, in particular, a slow course of the temperature. Components having a great thickness, for example in the range above 4 mm, require very long process times, which is firstly costly and can secondly cause cracks in the interior of the ceramic component. This can be alleviated by the water-soluble additive polyethylene glycol, in particular with chain lengths of up to 4000 g per mole, in the binder system. The components can be laid in a water bath which can leach out the polyethylene glycol before the thermal processes, i.e. the binder removal and sintering. This can result in formation of intrinsic porosity which can allow free and accelerated thermal binder removal.

As regards the triethanolamine carboxylic ester, mention may be made, in particular, of advantageous examples in which the chain lengths of the carboxylic acids esterified with the triethanolamine are in the range from greater than or equal to 8 to less than or equal to 30 carbon atoms. This constituent can serve as dispersant and thus serve to give a particularly homogeneous composition for forming a component having particularly homogeneous properties.

The production of the ceramic composition, in particular together with the binder system described, can preferably be carried out in a kneading apparatus, for example a twin-screw kneader (TSK). For this purpose, the mixture of all constituents of the formulation can be dispersed and homogenized in the kneading apparatus above the melting point of all organic components. On exit of the melt produced in this way from a slit, for example a die slit, of the kneading apparatus, the extruded composition formed can be pelletized into small pieces in an injection-molding machine or be plasticized in an extruder and injection-molded or extruded.

Due to the properties of the abovementioned binder system, the production of ceramic components, for example with internal functional layers such as conductor tracks, can be achieved in an advantageous way, for example by means of the half-shell technique. This makes it possible to produce extremely stable and vibration-resistant structural units whose functional layers are particularly well protected against corrosive and mechanical attack.

The constituents used are chemically compatible with one another, so that no unwanted reaction products occur during the injection-molding operation, but a defined product can instead be produced. Furthermore, in the case of in-mold labeling, for example, a high compatibility of the label introduced or the functional layer introduced with the ceramic composition is advantageous for defect-free and strongly adhering application of the functional layers. This can be achieved, in particular, by the above-described binder system, since it becomes possible for the functional layer and the ceramic composition to contain related organic base components, which is not ensured according to the prior art.

In an embodiment, the binder system comprises
from greater than or equal to 10% to less than or equal to 25% of polyvinyl butyral;
from greater than or equal to 15% to less than or equal to 35% of polyacrylate;
from greater than or equal to 35% to less than or equal to 60% of polyethylene glycol; and
from greater than or equal to 5% to less than or equal to 20% of triethanolamine carboxylic ester,
where the abovementioned constituents can together make up less than or equal to 100%.

It has surprisingly been found that particularly in the case of this composition, a particularly advantageous combination of the properties of the binder system and of a ceramic composition provided with the binder system is possible. In particular, particularly good rheological behavior or flow behavior combined with excellent shapability, dimensional accuracy and shape stability can be achieved with this composition. It makes it possible, in an inexpensive way, to produce dimensionally accurate components which have particular long-term stability. In detail, particularly advantageous rheological behavior, which can offer advantages in an injection-molding process and also in an extrusion process, is made possible by a system described in detail with reference to the binder system combined with a ceramic component. In detail, good flowability can be made possible at elevated temperatures, while a particularly high strength can be achieved at room temperature, for example. In addition, removal of a binder system of this type in a greatly shortened time can be made possible, and this can further reduce process costs.

As regards further technical features and advantages of the injection-molding composition of the disclosure, explicit reference is hereby made to the explanations in relation to the use according to the disclosure, the process of the disclosure, the figures and also the description of the figures.

The present disclosure further provides a use of a ceramic composition formulated as described above for producing a combustion chamber pressure sensor, in particular for producing an insulation body of a combustion chamber pressure sensor. A ceramic composition formulated in this way, in particular with a binder system formulated as described above, can be particularly advantageous for forming an insulating component, in particular an insulating pressure punch for a combustion chamber pressure sensor having piezoelectric sensor elements arranged between the insulation punches. Such insulating insulation punches have to meet demanding requirements in respect of the dimensional accuracy since otherwise an unsymmetrical structure of the sensor module, for example comprising pressure punch, contact plates, sensor elements and lines, would result. The consequence of nonobservance of precise dimensional accuracy can be inhomogeneous pressure loading of the sensor element, which can lead to loss of the signal or even to degradation of the sensor. Such disadvantages can be avoided when using a ceramic composition as described above and/or a binder system as described above owing to the high dimensional accuracy which can be achieved therewith.

Furthermore, it is possible to prevent the formation, as in a conventional dry pressing process, of circumferentially raised flash at the outer edges of the component which has to be removed in a costly manner in order to allow a flat, parallel construction technique of a sensor module. Rather, slightly rounded edges in the form of defined radii, which could be realized in the dry pressing process only with an extremely high outlay, are made possible in order to ensure mechanical strength.

Thus, extremely high molding accuracies combined with completely homogeneous component densities can be achieved. This results in a purely isotropic, highly precise shrinkage during sintering of the component. Extremely homogeneous and pore-free ceramic microstructures are thus achieved.

The use of the above-described ceramic composition makes it possible to prevent the insulation resistance from dropping below the permissible tolerance limit, for instance when exposed to a humid atmosphere, which is particularly important in the case of a combustion chamber pressure sensor or an insulation body for this in order to produce highly precise measurements. Such formation of an electrically conductive film on the component surface can be prevented by the provision of silicon dioxide since a phase containing silicon dioxide gives a ceramic which makes the attachment of hydroxyl groups and thus a film of water difficult or prevents it entirely due to a reduced tendency for attachment of water. Thus, the required insulation quality or the required electrical insulation resistance, for example in the teraohm range, can be ensured when using the above-described ceramic composition. However, the provision of silicon dioxide can reduce or completely prevent the incorporation of films of water, as a result of which the insulation resistance can remain particularly stable. In addition, an insulation punch of this type is particularly stable, which is advantageous under use conditions. A highly accurate, dimensionally stable component having a very good and stable insulation quality is thus possible.

As regards further technical features and advantages of the use according to the disclosure, reference is hereby explicitly made to the explanations in relation to the ceramic composition of the disclosure, the process of the disclosure, the figures and the description of the figures.

The present disclosure further provides a ceramic injection-molding process for producing a combustion chamber pressure sensor, in particular for producing an insulation body of a combustion chamber pressure sensor, which comprises the process steps:

a) provision of a ceramic composition as described above;
b) shaping of the ceramic composition in an injection-molding apparatus;
c) removal of binder from the shaped ceramic composition; and
d) sintering of the shaped composition which has optionally been subjected to binder removal.

The above-described process for producing a combustion chamber pressure sensor or, in particular, a ceramic insulation body for such a sensor makes it possible to meet very demanding requirements in respect of dimensional accuracy, stability, longevity and insulation quality in a particularly advantageous way. It is thus possible to produce a sensor which allows very accurate and stable measurements over a long period of time.

In a first process step a), a ceramic composition comprising a ceramic component in a proportion of greater than or equal to 50% by weight and a glass component in a proportion of less than or equal to 50% by weight is provided, where the ceramic component comprises aluminum oxide and the glass component comprises silicon dioxide or a silicon dioxide precursor and, in addition, an alkaline earth metal oxide or an alkaline earth metal oxide precursor is provided. In this way, the advantageous properties of an aluminum oxide ceramic can be combined with those of silicon dioxide. In detail, it is possible to produce a particularly stable ceramic which is also very suitable, in particular, for insulation components. The presence of silicon dioxide in particular can prevent the attachment of films of water to the ceramic body, as a result of which the formation of an electrically conductive layer on the insulation body can also be prevented. The insulation quality of the ceramic produced can be significantly improved thereby. A binder system as described above can optionally be constituent of the ceramic composition provided.

Such a ceramic composition is, in process step b), shaped in an injection-molding apparatus or in an injection-molding tool, as is known per se from the prior art. Such a shaping process allows, in a particularly advantageous way, the production of a shaped part which has particularly high dimensional accuracy and can be produced in a particularly defined and reproducible manner, especially in combination with the above-described ceramic composition.

After shaping, an in particular slow removal of binder from the shaped composition until the organic binder system constituents are completely driven off is carried out in a further process step c).

The components are, by way of example and not necessarily, stored in a water bath for 10-100 hours. Here, the water-soluble organic constituents are dissolved from the component. This is followed by drying with a subsequent thermal partial binder removal up to 240° C. This leaves a residual content of organic constituents of 1-3% in the components, which still gives the components sufficient strength for the components to be introduced without damage into the sintering furnace. Complete binder removal and sintering then occurs in the sintering furnace.

Finally, the composition from which the binder has been removed is sintered to produce the ceramic component in a process step d). During sintering, a characteristic microstructure made up of aluminum oxide with glass or silicon dioxide as triple-point filling can be formed. Depending on the sintering temperature, in particular as a result of selection of a high temperature, a sinter skin of glass can also be formed on the component surface, which can have an additional favorable effect on the insulation capability.

It will be apparent to a person skilled in the art that the abovementioned process steps, in particular steps c) and d), can be carried out in a suitable order and optionally together.

The above-described process forms a ceramic body which can have two phases, namely, in particular, a ceramic phase comprising aluminum oxide and a glass phase comprising, inter alia, silicon dioxide. The ratios of the phases can correspond to the ceramic composition or can have changed during the production process.

Particularly when there a microstructure having grain sizes and pore sizes in the range below 10 µm, a particularly advantageous insulation quality or insulation capability can be achieved. Furthermore, production of the desired ceramic product can be ensured even when using precursors of silicon dioxide or of alkaline earth metal oxides.

In particular but without imposing a restriction, aluminum oxide or the ceramic phase can be present in a proportion of greater than or equal to 50%, with silicon dioxide or the glass phase being able to be present in a proportion of less than or equal to 50%. For example, aluminum oxide or the ceramic phase can be present in a proportion of from greater than or equal to 90% to less than or equal to 95%, with silicon dioxide or the glass phase being able to be present in a proportion of from greater than or equal to 5% to less than or equal to 10%. In this embodiment, the positive properties of aluminum oxide or of a pure aluminum oxide ceramic can particularly advantageously be essentially retained, while the positive properties of an association of aluminum oxide with a silicate glass can be achieved particularly advantageously. In particular, in this embodiment, a particularly high strength combined with an excellent insulation quality can be achieved and the flow behavior in a production process, in particular in an injection-molding process, can also be influenced particularly positively.

The ceramic can thus be basically composed of two phases. A first phase A comprises, in particular, essentially aluminum oxide which can, in particular, be present in crystalline form as α-alumina. A second phase B is the phase containing silicate glass and thus comprises the silicon dioxide. This phase is thus at least partially vitreous and can, for example, be composed of silicon dioxide, aluminum oxide and alkaline earth metal oxides and optionally carbonates, in particular calcium carbonate, magnesium carbonate, strontium carbonate and talc. Here, purely by way of example and without implying a restriction, a ratio of alkaline earth metal oxide to silicon dioxide of from 30% by weight:70% by weight to 70% by weight:30% by weight can be present. This can, for example, be set via the base formulation of the ceramic composition. The proportion of aluminum oxide in phase B is established, in particular, as a function of the sintering temperature and on the basis of an appropriate solution behavior. For example, at a silicon oxide to calcium oxide ratio of 50:50 and a sintering temperature of 1600° C., an aluminum oxide content in phase B of about 50% is established. During cooling, the vitreous phase B can partially crystallize. The phases which crystallize out contain, in particular, silicon dioxide and thus perform the function of reducing the attachment of hydroxyl groups to the surface of the ceramic component.

In one embodiment, the ceramic composition can be homogenized before shaping in process step b). In this embodiment, it is thus possible to produce a particularly homogeneous composition in which, for example, aluminum oxide and silicon oxide are particularly homogeneously distributed. In this way, it is possible to avoid attachment of a film of water at virtually any place, which allows a particularly good insulation quality of a component to be produced. In addition, the binder can be finely dispersed in addition to the ceramic constituent, which makes a particularly homogeneous component having properties which are constant throughout the component possible. Homogenization can be carried out by a kneading process, e.g. twin-screw kneader (TSK), shearing rollers, co-kneaders, etc., at temperatures of 60° C.-220° C. In detail, the mixture of all constituents of the ceramic composition can be dispersed and homogenized in the kneading apparatus at above the melting point of all organic components. On exit of the melt produced in this way through a slit, e.g. a die slit, of the kneading apparatus, the strand of ceramic composition formed can be pelletized into small pieces. Such small pieces can subsequently be, after addition of a ceramic powder for the ceramic component, plasticized and injection-molded or extruded in an injection-molding machine or in an extruder, as has been explained above. In this embodiment, a particularly homogeneous binder system can be produced, which also makes particularly homogeneous properties possible in the component to be produced.

In a further embodiment, the ceramic composition can be introduced into the injection-molding tool by means of 1-point injection. In this embodiment, 1-point injection at the side or lateral 1-point injection can, in particular, advantageously be realized at the level of the tool parting. Such 1-point injection, in particular by means of lateral injection, makes possible particularly highly precise and flash-free surfaces of great evenness. This can make components having particularly tight tolerances in respect of dimensional accuracy possible without the need for a complicated final machining process. In addition, such injection offers the advantage, in particular over two-point or multipoint injection, that the tool cavity is filled without occurrence of joining seams. Potential weak points in the ceramic body can be prevented thereby.

In a further embodiment, the injection-molding tool can have a surface roughness in the range below 10 µm in its interior. Such a roughness in the interior of the injection-molding tool can mean, in particular, that the injection-molding tool has, in particular, such a roughness at that point where the ceramic composition serving as injection-molding composition can come into contact with the injection-molding tool. In this embodiment, particularly even or dimensionally accurate surfaces can be produced. This can make highly accurate and reliable measurements possible, in particular in the case of pressure sensors. For example, such a smooth surface can be achieved by polishing of the injection-molding tool, for instance of the tool core.

In a further embodiment, sintering at a temperature in the range from greater than or equal to 1200° C. to less than or equal to 1900° C. can be carried out in process step d). For example, sintering at a temperature of 1580° C. for a period of 1 hour can be carried out. The use of such a temperature promotes reaction of the alkaline earth metal compounds with silicon dioxide and aluminum oxide and formation of a melt. Here, the temperature is selected at a sufficiently low level for excessively great grain growth of the aluminum oxide to be prevented and the fineness of the microstructure to be ensured.

BRIEF DESCRIPTION OF THE DRAWINGS

Further advantages and advantageous embodiments of the subject matter of the disclosure are illustrated by the drawings and explained in the following description. It should be noted that the drawings have only a descriptive character and are not intended to restrict the disclosure in any way. The drawings show FIG. 1 a schematic depiction of an embodiment of part of a combustion chamber pressure sensor comprising two insulation bodies produced by the process of the disclosure.

DETAILED DESCRIPTION

Figure 1:
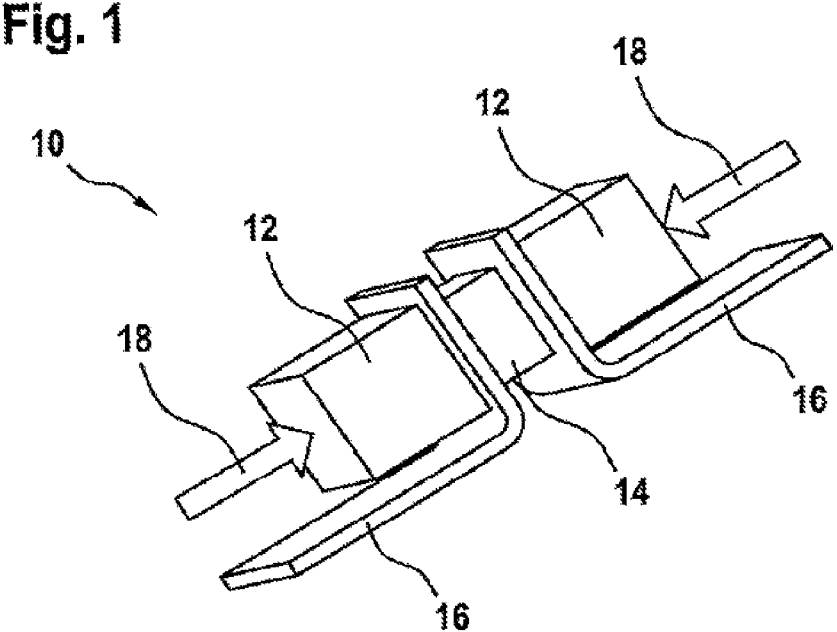

FIG. 1 shows a subregion of a combustion chamber pressure sensor 10. Such a combustion chamber pressure sensor 10 comprises two insulation bodies 12 which serve as pressure punches. The pressure punches act on a piezoelectronic element 14, for example a quartz crystal. When a force is exerted on the pressure punches or insulation bodies 12, as indicated by the arrows 18, the piezoelectronic element 14 can emit a signal which can be transmitted, for instance via line structures 16, to an evaluation unit. A force can, for instance, be generated by a sliding pin which can be moved by the pressure in a combustion chamber, while the further force can be provided by a fixed stop.

Such an insulation body 12 is, in particular, a ceramic body comprising a ceramic phase in a (purely illustrative and in no way restrictive) proportion of greater than or equal to 50% by weight and a glass phase in a (purely illustrative and in no way restrictive) proportion of less than or equal to 50% by weight, where the ceramic phase comprises aluminum oxide and the glass phase comprises silicon dioxide.

Figure 2:
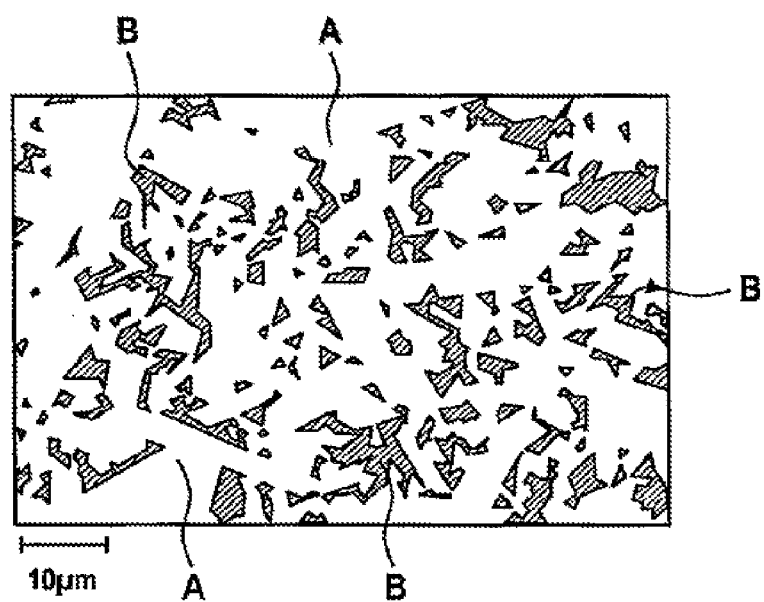
FIG. 2 a schematic depiction of a ceramic microstructure produced by a process according to the disclosure.

A microstructure of such a ceramic material is shown in FIG. 2. In FIG. 2, the ceramic phase is denoted by A and the glass phase by B. It can be seen that the base structure is formed by ceramic material, in particular aluminum oxide, while the vitreous phase B comprises, in particular, silicon dioxide. Basically, purely by way of example and without constituting any restriction, the ceramic component or the phase A can be present in a proportion of greater than or equal to 50% by weight and the glass component or the phase B can be present in a proportion of less than 50% by weight. An alkaline earth metal and silicon dioxide and aluminum oxide can also be present in the phase B.

Figure 3:
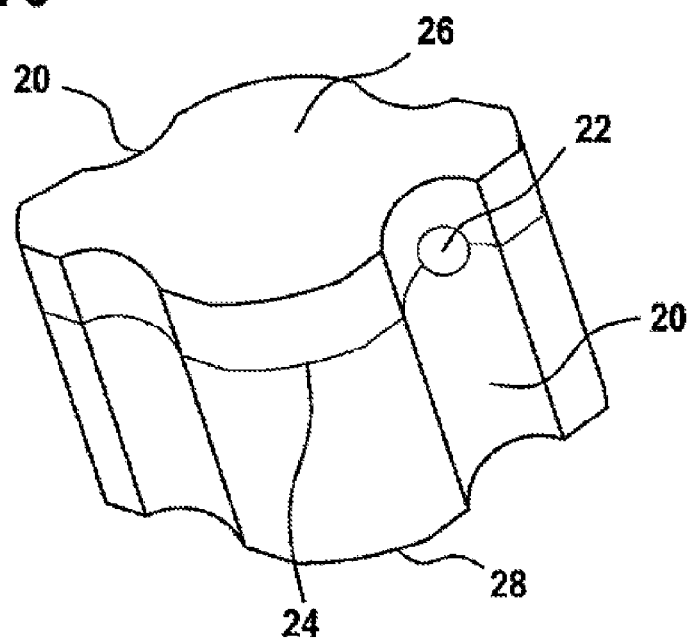
FIG. 3 a schematic depiction of an embodiment of an insulation body produced by the process of the disclosure.

An illustrative example of an insulation body 12 is also shown in FIG. 3. In FIG. 3, the insulation body 12 is rounded and has channels 20, for instance to be able to accommodate a line structure 16 from a piezoelectronic element 14 to an evaluation unit.

Such an insulation body 12 can be produced as follows. The starting substance is a ceramic composition comprising a ceramic component in a proportion of greater than or equal to 50% by weight and a glass component in a proportion of less than or equal to 50% by weight, where the ceramic component comprises aluminum oxide and the glass component comprises silicon dioxide or a silicon dioxide precursor and, in addition, an alkaline earth metal oxide or an alkaline earth metal oxide precursor is provided. Here, the alkaline earth metal oxide precursor can be selected from the group consisting of carbonates, in particular calcium carbonate (lime), magnesium carbonate, strontium carbonate and talc, and/or the silicon dioxide precursor can be selected from the group consisting of lime and talc.

As regards a binder system provided in the injection-molding composition, this can comprise a mixture comprising polyvinyl butyral, at least one polyacrylate, at least one polyethylene glycol and at least one triethanolamine carboxylic ester.

Starting out from the ceramic composition, the insulation body 12 can be produced by a process comprising the process steps:

a) provision of a ceramic composition as described above and optionally homogenization of the ceramic composition;

b) shaping of the ceramic composition in an injection-molding apparatus, for instance with the ceramic composition being able to be introduced into the injection-molding tool by 1-point injection and/or, by way of example, at temperatures of from greater than or equal to 12° C. to less than or equal to 200° C.;

c) removal of binder from the shaped composition; and d) sintering of the shaped composition which has optionally been subjected to binder removal, for example at a temperature in the range from greater than or equal to 1200° C. to less than or equal to 1900° C.

In the insulation body 12 as per FIG. 3, the gate mark 22 of the 1-point injection and the tool parting 24 of the injection-molding tool, i.e. the plane of the component at which the tool opens for taking out the component, are shown schematically. This is not located, as in the case of, for example, dry pressing, on the upper or lower flat surface but is set back into the upper third of the component. This measure guarantees defect-free and accurately shaped functional surfaces 26, 28 which are located on the upper side or the underside, respectively. After the injection-molding operation, the sprue can be sheared off during opening of the tool, so that no projecting material remains. If the gate mark 22 remains visible in the green, i.e. unsintered, state or in the sintered component, this does not interfere here.

After the component has been taken from the injection-molding tool or from the cavity, the component can be subjected to binder removal on loose material spread out on plates and sintered at about 1580° C. without deformation occurring.

Figure 4:
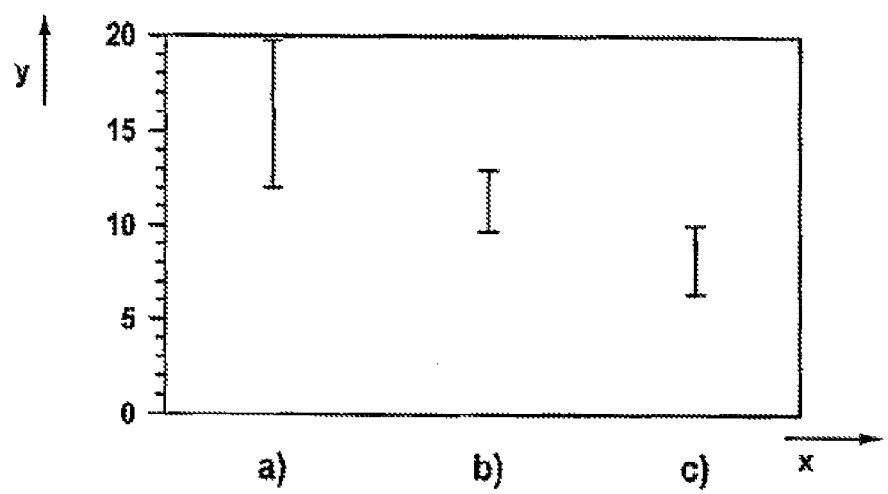
FIG. 4 a depiction showing an effect of a ceramic produced according to the disclosure.

The advantage of an improved insulation quality of an insulation body produced in this way is indicated in FIG. 4 where various materials are positioned on the X axis. Here, a) corresponds to aluminum oxide ($Al_2O_3$), b) corresponds to titanium dioxide ($TiO_2$) and c) corresponds to silicon dioxide ($SiO_2$), while the number of attached OH groups per $nm^2$ is indicated on the Y axis. It can be seen that, under identical conditions, the attachment is significantly reduced in the case of silicon dioxide. This can, as explained in detail above, significantly increase the insulation quality.

What is claimed is:

1. A ceramic composition for an injection-molding process for producing a combustion chamber pressure sensor, comprising:
a ceramic component in a proportion of greater than or equal to 50% by weight, the ceramic component comprising aluminum oxide;

a glass component in a proportion of less than or equal to 50% by weight, the glass component comprising silicon dioxide or a silicon dioxide precursor;

an alkaline earth metal oxide or an alkaline earth metal oxide precursor; and a binder system that comprises a mixture including polyvinyl butyral, at least one polyacrylate, at least one polyethylene glycol, and at least one triethanolamine carboxylic ester.

2. The ceramic composition according to claim 1, wherein the alkaline earth metal oxide or the alkaline earth metal oxide precursor and the silicon dioxide or the silicon dioxide precursor is present in such an amount as to set a ratio of alkaline earth metal oxide to silicon dioxide of 30% by weight: 70% by weight to 70% by weight: 30% by weight.

3. The ceramic composition according to claim 1, wherein the alkaline earth metal oxide precursor is a carbonate.

4. The ceramic composition according to claim 1, wherein:
the ceramic composition includes the silicon dioxide precursor, and
the silicon dioxide precursor is selected from the group consisting of talc and kaolin.

5. The ceramic composition according to claim 1, wherein the binder system comprises:

from greater than or equal to 10% to less than or equal to 25% of polyvinyl butyral;

from greater than or equal to 15% to less than or equal to 35% of polyacrylate;

from greater than or equal to 35% to less than or equal to 60% of polyethylene glycol; and from greater than or equal to 5% to less than or equal to 20% of triethanolamine carboxylic ester, the abovementioned constituents together making up less than or equal to 100%.

6. The ceramic composition according to claim 1, wherein the ceramic composition is used to produce a combustion chamber pressure sensor.

7. The ceramic composition according to claim 1, wherein the injection-molding process is configured to produce an insulation punch of the combustion chamber pressure sensor.

8. The ceramic composition according to claim 1, wherein the alkaline earth metal oxide precursor is selected from the group consisting of calcium carbonate (lime), magnesium carbonate, strontium carbonate, and talc.

9. The ceramic composition according to claim 6, wherein the ceramic composition is used to produce an insulation body of the combustion chamber pressure sensor.

* * * * *